April 22, 1969

W. E. COMAN 3,440,433

AIRCRAFT STARTER CONTROL

Filed May 19, 1966

WILLIAM E. COMAN
INVENTOR.

BY

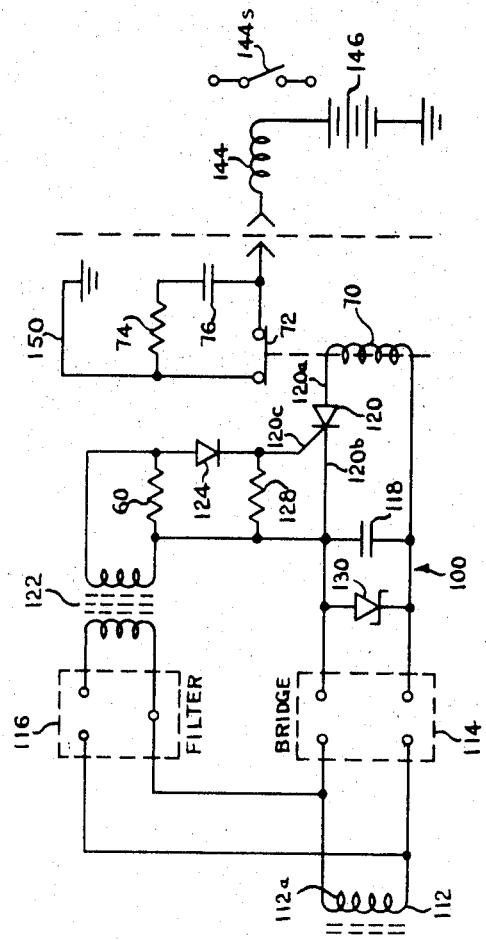
FIG. 2
WILLIAM E. COMAN
INVENTOR.
BY 

United States Patent Office 3,440,433
Patented Apr. 22, 1969

3,440,433
AIRCRAFT STARTER CONTROL
William E. Coman, Newport, N.Y., assignor to The
Bendix Corporation, a corporation of Delaware
Filed May 19, 1966, Ser. No. 551,371
Int. Cl. H02p 9/04
U.S. Cl. 290—38                    10 Claims

ABSTRACT OF THE DISCLOSURE

An aircraft starter control employing a solid state switching device and a magnetic pick-up which has both a power and a frequency output. When the frequency output reaches a predetermined level, indicative of engine start, the signal is passed through a filter to close a circuit and establish a command signal to turn off the starter.

---

Figure 1:
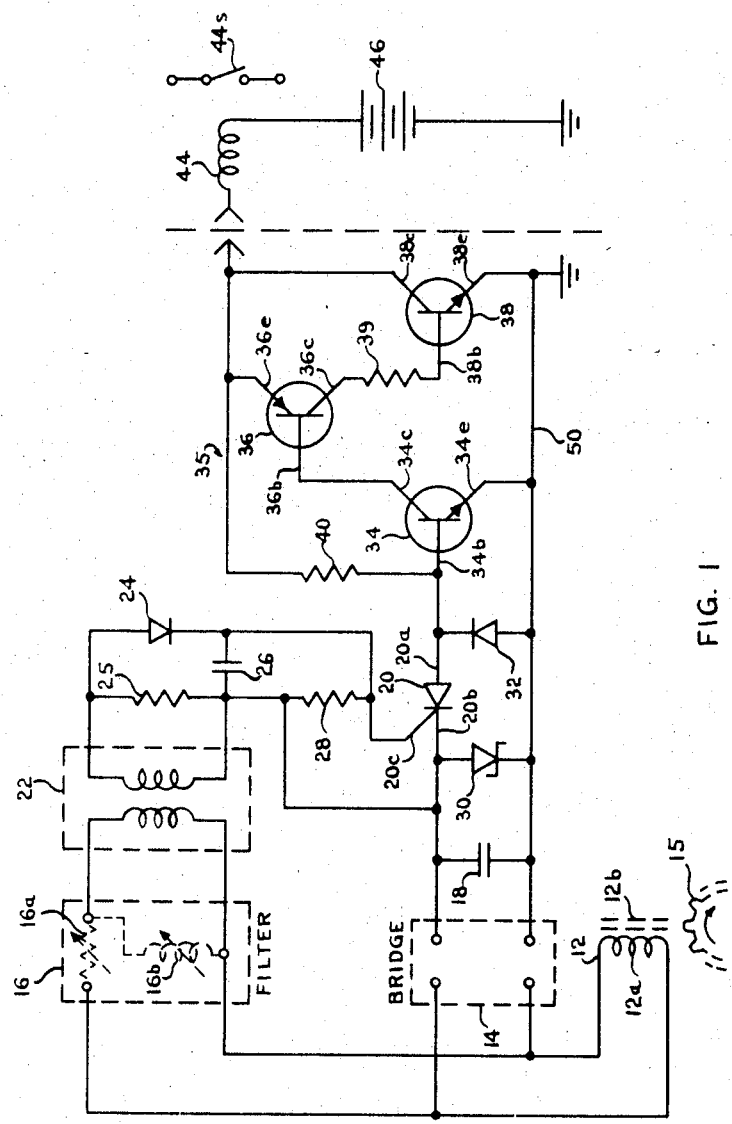

The present invention relates to an aircraft starter control mechanism and, more particularly, to an aircraft starter control mechanism employing a solid state switching device and a magnetic pick-up which has both a power output and a frequency output.

It is an object of the present invention to provide an aircraft starter control mechanism which is more accurate than known control mechanisms.

It is an object of the present invention to provide an improved starter control mechanism which is lighter in weight than known control mechanisms.

It is an object of the present invention to provide a novel aircraft starter control mechanism which as a significantly faster response time than known devices.

It is an object of the present invention to provide a novel aircraft starter control mechanism which, in cooperation with a turbine starter, permits increased turbine efficiency.

It is an object of the present invention to provide a novel aircraft starter control mechanism which is more reliable than known devices.

It is a further object of the present invention to provide a novel aircraft starter control apparatus which employs solid state switching.

It is a further object of the present invention to provide a novel aircraft starter control mechanism which automatically prepares itself for the next start.

It is an object of the present invention to provide a novel aircraft control mechanism which can sense and control speed of a turbine or other mechanism from locations unaccessible with known devices.

It is an object of the present invention to provide an aircraft starter control which prevents false or unwanted initiation of the starting cycle, particularly, as the starter turbine is slowing to a stop following an attempted start.

It is a still further object of the present invention to provide a novel aircraft starter control mechanism which is capable of operating accurately and reliably at higher temperatures than known control mechanisms.

It is a still further object of the present invention to provide a novel aircraft starter control mechanism which is adapted to operate independently of the aircraft power supply.

It is a still further object of the present invention to provide a novel aircraft starter control mechanism in which the electrically-generated speed signal provides both a speed control signal and a power output.

The foregoing and other additional objects and advantages of the present invention will appear more fully hereafter from a consideration of the detailed description which follows, taken together with the accompanying drawing wherein embodiments of the present invention are illustrated. It is to be expressly understood, however, that the drawing is for the purpose of illustration and description and is not to be construed as to defining the limits of the invention.

FIGURE 1 shows an embodiment of the present invention having an electronic switching circuit; and FIGURE 2 shows an embodiment of the present invention having a combination of mechanical and electronic switching circuits.

Turning now to FIGURE 1, there is shown generally by the numeral 10 a control mechanism for an aircraft starter. A rotating gear or a clearance wheel 15 induces an electric potential or voltage in a winding 12a of a magnetic pick-up 12 having a magnetic member 12b associated therewith. The electrical output of the magnetic pick-up 12 is connected to a rectifier 14 which may be a four diode bridge. The rectified output of the magnetic pick-up 12 is smoothed by a capacitor 18 and fed to the base or cathode of a solid state transistor switch member 20 which is shown as a silicon controlled rectifier having a cathode 20b, an anode 20a, and a gate lead 20c. The output of the magnetic pick-up is also sent to a filter mechanism 16 which might consist, as shown, of a resistor member 16a and a coil or inductor member 16b, both or either of which may be adjustable as shown. The output of the filter which is shown as a high pass or low block filter is fed to a transformer member 22 which may be either an isolating or a step-up or a step-down transformer, for example. The output of the filter member fed through the transformer is rectified by a diode 24 and smoothed by a capacitor 26 or any other comparable network and is fed to the gate lead 20c of the silicon controlled rectifier. A resistor 25 is connected in parallel with the transformer member and a resistor 28 is attached in parallel with the capacitor member 26. A Zener diode member 30 is connected between ground 50 and the cathode or base lead 20b of the silicon controlled rectifier or solid state switch member 20. Another diode 32 is interconnecting the anode 20a and the ground 50; however, diode 32 is reversed in direction and will conduct only when the ground lead has a higher potential than the anode 20a of the silicon controlled rectifier.

A transistor amplifier 35 consists of first and second transistor members 34 and 36, respectively. Transistor 34 has an emitter lead 34e, a base lead 34b, and a collector lead 34c. Similarly, transistor 36 has an emitter lead 36e, a base lead 36b and a collector lead 36c. The collector lead 34c is connected to the base lead 36b of the transistors 34 and 36, respectively. A third transistor member 38 having a base lead 38b and an emitter lead 38e and a collector lead 38c is interconnected to the collector lead 36c of transistor 36 by a resistor member 39. A transistor member 38 is operating basically as a second switch member. The collector 38c of the transistor switch 38 is connected to a load member 44 which is shown as a winding and which may operate a relay or switch load 44s. The load is connected to the high side of a battery 46 which has its low side grounded.

In operation, when it is desired to start the aircraft engine, the starter button (not shown) is pressed and the turbine of the starter or other mechanism commences to rotate. As it does so, it rotates gear member or wheel member 15 and it induces an electric potential in winding 12a. This potential is rectified and passed to the smoothing capacitor 18 and then conducted to the first solid state switch member 20. At the same time the voltage signal is passed to the high pass filter 16. At an early point in the starting cycle when the turbine of the engine to be started is below starting speed, essentially no signal is fed through the filter and, consequently, substantially no signal appears at the gate lead 20c of the first solid state switch member 20. During this time, the collector lead of the solid state switch 38 and the base of the first section of the transistor amplifier 34 are connected relative to the aircraft battery 46 through the load 44 which may be the operating coil of a relay 44s. During this period of operation of the control mechanism, the first solid state switch member 20 is in a non-conducting state which means that a small current is drawn through the resistor member 40 and applies a somewhat more positive voltage to the base 34b than is supplied to the emitter 34e of the first transistor amplifier stage 34. This causes the transistor member 34 to conduct and maintains the collector lead of the transistor member 34 and the base lead 36b of the second transistor stage 36 at a lower voltage than that of the emitter lead 36e of the second transistor amplifier stage 36 which, in turn, insures that it too is conducting. Further, this insures that the base lead 38b is at a somewhat higher potential than that of the emitter lead 38e of the switch 38 and insures, in turn, that transistor 38 which is a second solid state switch member is in a conducting condition, insuring that a relatively large current can flow through the load.

When, however, the turbine reaches the preset speed, the high pass filter 16, which may be a high Q filter having a relatively narrow band width reaches a predetermined output, a signal which is smoothed by a capacitor 26 and diode 24 is presented to the gate 20c of the first solid state switch member 20. This potential must be higher than that supplied to the base or cathode 20b of the switch member 20 and causes the "turn on" or conduction of the solid state switch member 20. Conduction of the first solid state switch member 20 lowers the voltage on the base of the first transistor member 34 and immediately biases it into the "cut-off" range. Cutting off transistor 34 also, of course, cuts off transistor 36 and switch member 38. This significantly reduces the current through the load member 44 and may cause a switch mechanism 44s to turn off the starter by shutting off its fuel or its air supply or some other functional part of the starter. As the starter turbine loses speed, the signal to the gate lead of the first solid state switch member 20 eventually disappears since the filter 16 blocks it out. At the same time the signal appearing across the solid state switch member 20 is also decreasing and eventually reaches such a low level that it can no longer sustain conduction through the silicon controlled rectifier 20. The current from the load is conducted to ground through the first transistor amplifier stage. This current conducted through the load 44 and through resistor 40 is insufficient to maintain switch 20 in a conducting state and the silicon controlled rectifier switch is returned to its non-conducting state.

Turning now to the second embodiment of the invention, shown in a diagrammatic view in FIGURE 2, similar parts will be shown with similar numbers beginning in the one-hundred series and will be considered not to need further explanation. Primarily, the difference between the two circuits is that the second embodiment operates without the benefit of the transistor amplifier section 35 shown in FIGURE 1 and employs a relay member 70 instead of a solid state transistor switch 38. Functionally, however, the circuits are very similar. In this embodiment of the present invention, conduction of the silicon control rectifier 120 draws current through the relay member 70 and opens the switch section 72 of relay 70, thereby interrupting current to the load 144.

It can be readily appreciated that the present invention accomplishes its stated objects. It permits the starter turbine to be run at a much higher speed closer to its maximum efficiency because of the significantly greater accuracy of the high pass filter, and transistor or relay switch combination. In addition, the proposed system is far lighter in weight than prior art mechanical switches. Weight saving on aircraft and on starters, in particular, which are frequently viewed as excess baggage, is highly valuable, especially in military applications.

The use of the solid state switching members rather than the mechanical relay members is, of course, more highly reliable since a transistor may be switched millions of times and no mechanical relay may be so operated. The Zener diode members 30 and 130 which appear in the diagrammatic views of FIGURES 1 and 2 are operative to stabilize the voltage applied to the cathode of the solid state switch member 20 and increase its reliability of operation. Importantly, the Zener diodes 30 and 130 respectively regulate the amplitude of the voltage pulsations from the voltage source 12 by regulating the voltage at the diode bridge 14. Since the diode bridge 14 and the filter network 16 are interconnected, regulation of the diode bridge voltage regulates the filter network voltage. A frequent cause of voltage variation at filter 16 (in the absence of the voltage stabilization) is the change in the size of the magnetic gap which exists between gear 15 and magnetic pick-up 12. The voltage stabilization provided by member 30 and 130 makes the change in the size of the magnetic gap of no consequence. Similarly, the diode 32 and 132 in each of FIGURES 1 and 2, respectively, is operative to sharpen the switching action of the solid state switch member 20 and to enhance the speed of response at the cut-off point. The transistors, shown in FIGURE 1, are shown as a NPN, PNP and NPN types, respectively. This enables the transistors to be added in pairs so that, for example, a five-stage transistor amplifier switch could have been used which would require virtually no more input power than the three-stage amplifier switch that was used. Cascading of alternating types of transistor amplifiers is very useful in switches of this type where power requirements must be kept low. This device permits the location of the speed sensing in places not formerly accessible to mechanical or electrical components since all that need be associated with the speed sensor is a magnetically sensitive item and no electrical components such as switches, transistors, tubes or other components which may be temperature sensitive. This permits the switch to be operated at temperatures and in environments not previously believed possible. Still further, both the transistor switch 38 and the silicon controlled rectifier switch 20 are reset automatically by the circuitry. Connecting the collector lead of the transistor switch 38 to the load 44 insures that sufficient power will be taken from the aircraft battery in the form of a small bleed current to hold the transistor switch 38 in an "on" condition during the period when switch 20 is in the non-conducting state. In addition, when the silicon controlled rectifier 20 is gated into the conducting state, it conducts through diode member 32 which then becomes a very low resistance in the forward direction. When diode 32 operates in its conducting mode, the base 34b is held at a lower potential than the emitter 34c of transistor 34. This diode action of member 32 holds transistor member 34 in an "off" state. Eventually when the potential across the switch member 20 is insufficient to sustain conduction through member 20, transistor member 34 is turned "on," since diode member 32 ceases to conduct and the potential is applied across the transistor member 34 base-emitter junction from resistor 40 to ground. The diode member 32 enables the switch member 20 to remain in a conducting state until the starter turbine speed falls below its starting speed. This insures that the starter will not accidentally initiate a new starting cycle.

The filter member 16 may be an RLC circuit or it may have active elements such as vacuum tubes or transistors. The filter member 16 may also be externally adjustable so that the control may be used on a number of types of aircraft starters and can be adjusted for the changing characteristics of the starter and the turbine to be started over the useful life of those units. In the present embodiment of the invention, the filter 16 is a band pass filter having a sharp low frequency cut-off and a weak high frequency cut-off to eliminate false triggering of the switch member 20 due to harmonics produced by the magnetic source of electrical power 12.

It should be understood that although certain circuit elements such as transistors, diodes and switches are shown as particular polarity types, for example, transistor 34 is shown as an NPN type, that elements of the reverse polarity, that is transistor 34 could be a PNP transistor. Similar reversals of polarity type may be made to some or all of the other circuit elements without the exercise of invention.

I claim:

1. An automatic control apparatus for an aircraft starter comprising:
    a magnetic means generating a signal proportional to speed;
    a rectifier means for converting a first portion of the signal to a unidirectional signal;
    a high pass filter means for blocking all of a second portion of said signal below a predetermined frequency corresponding to a specified starter speed;
    a solid state switch having an input electrode, an output electrode and a control electrode;
    said rectified signal applied to said input electrode;
    said filtered signal applied to the control electrode of the solid state switch;
    a translator amplifier means connected to the output electrode of the solid state switch; and
    a transistor switch member connected to said transistor amplifier means and adapted for connection to the starter control for terminating power output from the starter at a predetermined starter speed.

2. The apparatus as claimed in claim 1 wherein:
    said transistor switch member and said solid state switch are adapted to be automatically electronically reset.

3. The apparatus as claimed in claim 1 including further:
    a voltage stabilization means connected in parallel with the rectifier means.

4. The apparatus as claimed in claim 3 including further:
    a diode member connected in parallel with a portion of the transistor amplifier means.

5. Apparatus for controlling the operation of an aircraft starter comprising:
    electric signal generating means;
    a solid state electronic switching means having a control electrode, an input electrode and an output electrode;
    a rectifier means interconnecting said signal generating means and said input electrode;
    a frequency selective filter means interconnecting said signal generating means and said control electrode;
    switching means connected to the ouput electrode of the electronic switching means operative to control the aircraft starter in response to a signal applied to said control electrode; and
    said signal generating means operative to produce a signal of sufficient strength to control said switching means and having a frequency proportional to speed.

6. The apparatus as claimed in claim 5 wherein:
    said electric signal generating means includes a magnetic sensing means.

7. The apparatus as claimed in claim 5 wherein:
    said switching means comprises a solid state switch.

8. The apparatus as claimed in claim 7 wherein:
    a transistor amplifier means is disposed intermediate said solid state switch and said solid state electronic switching means.

9. The apparatus as claimed in claim 8 wherein:
    said transistor amplifier means comprises a plurality of transistors of an alternating type.

10. The apparatus as claimed in claim 9 wherein:
    said transistor amplifier means and said control solid state switch means comprises transistors of an alternating type.

References Cited

UNITED STATES PATENTS

| | | | |
|---|---|---|---|
| 2,941,120 | 6/1960 | Harman et al. | 317—5 |
| 2,881,587 | 4/1959 | Loudon | 60—39.14 |
| 3,045,426 | 7/1962 | Brahm | 60—39.14 XR |
| 3,151,450 | 10/1964 | Blackaby | 60—39.14 |
| 3,201,648 | 8/1965 | Kerr | 317—5 |
| 3,220,396 | 11/1965 | Heidner et al. | 317—5 XR |
| 3,242,346 | 3/1966 | Skoubo | 290—40 |
| 3,264,482 | 8/1966 | Clark et al. | 60—39.14 XR |
| 3,284,668 | 11/1966 | Heaslip | 317—5 |

BENJAMIN DOBECK, *Primary Examiner.*

G. R. SIMMONS, *Assistant Examiner.*

U.S. Cl. X.R.

60—39.14; 317—5